April 25, 1967  J. F. THIER  3,316,012
AUTOMOBILE COVER
Filed Oct. 23, 1965

INVENTOR.
JUERGEN F. THIER
BY
ATTORNEYS.

United States Patent Office 3,316,012
Patented Apr. 25, 1967

3,316,012
AUTOMOBILE COVER
Juergen F. Thier, 93—10 Lamont Ave.,
Elmhurst, N.Y. 11373
Filed Oct. 23, 1965, Ser. No. 503,368
7 Claims. (Cl. 296—136)

The present invention relates to a new and improved automobile cover.

In the past, many types of covers have been provided for the protection of automobiles, especially those stored on the street or exposed to the atmosphere. In order to protect stored or parked vehicles, many forms of covers or tarpaulins have been provided which have served their purpose in protecting such vehicles.

In view of the size of vehicles, the coverings have necessarily had to be large and somewhat bulky. The covers, because of size, have also been inconvenient or slow to install and secure.

To this end, attempts have been made to provide such covers with means for securing them on automobiles and means for facilitating installation. Such means have been achieved in the past but have not achieved the simplicity of the present invention combined with the security of installation and the speed in which such cover may be installed.

According to the present invention, a new improved automobile cover is provided which may be easily, quickly and securely installed.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
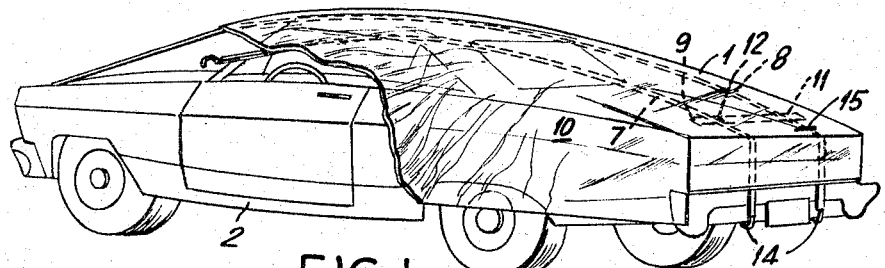
FIG. 1 is an isometric side view of an automobile, with the cover of the present invention, partially installed.
Figure 2:
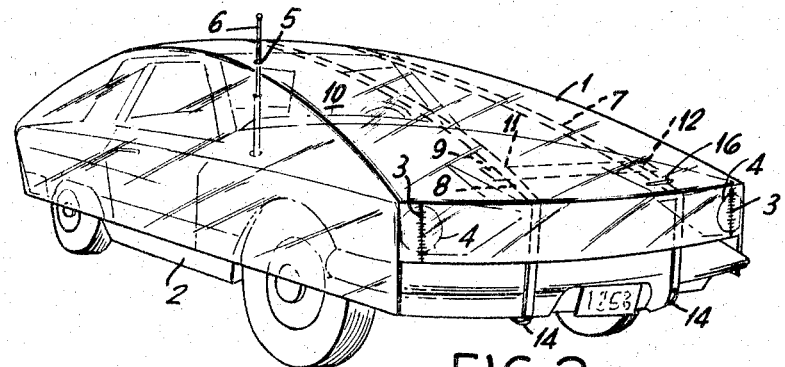
FIG. 2 is an isometric front view of an automobile with a cover of the present invention installed.
Figure 3:
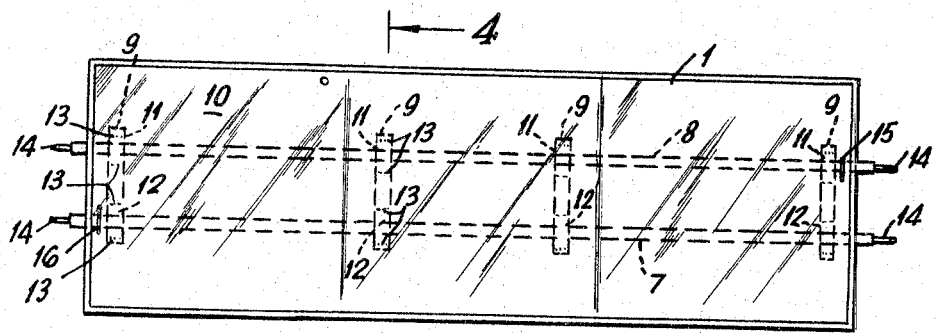
FIG. 3 is a plan view of the cover of the present invention.
Figure 4:
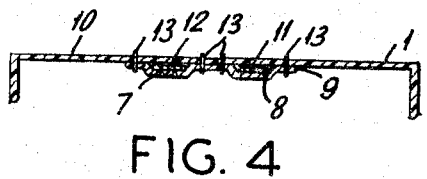
FIG. 4 is a section of FIG. 3 taken at lines 4—4.

The automobile cover 1 is preferably made of some form of weather resistant fabric or plastic. The cover 1 conforms generally to the shape of a specific automobile 2, though modular covers may be provided to fit a variety of models.

When as shown, the cover 1 is tailored to a particular model automobile 2, it may be provided with zippers 3 to fit over the protrusion of the headlights 4 of the automobile 2 so that the installed cover 1 may slip on easily, yet snugly fit the automobile 2.

Provision is usually necessary for an opening 5 adapted to permit the protrusion of an antenna 6 where the antenna 6 extends upward beyond the covering curvature of the cover 1.

Preferably within the body of the cover 1 are straps 7, 8 which are substantially parallelly placed and held in position by guides 9 which may be longitudinal straps fixed to the body 10 of the cover forming channels 11, 12. While illustrated in the figures as straps crossing the body 10 and formed into channels 11, 12, the channels 11, 12 could be individually placed providing the same purpose. In the figures, the guides are provided with stitching 13 defining the channels 11, 12. Believed within the scope of the present invention are channels cut through the body 10 to serve as guides.

Each strap 7, 8 is provided with a hook 14 which is adapted to grasp the underside of the automobile 2. One strap 8 is attached to the body 10 of the cover 1 at a point 15 while the other strap 7 is attached to the body 10 at another point 16, both points 15, 16 being diametrically opposite each other.

In use, the automobile cover 1 is brought in folded condition to the rear of an automobile 2. The hook 14 on the strap 8, which is attached at the point 15 near the hook 14 is engaged with the automobile 2. The further end of the strap 8 is then brought over the automobile 2 and hooked on to the front of the automobile 2. The strap 8 forms a track to guide the placement of the cover 1. The hook 14 on the strap 7 is then grasped and pulled over the front of the automobile 2, pulling the main body 10 of the cover 1 into position, making necessary adjustments to allow the antenna of the automobile 2 to get through the opening 5 in the cover 1.

When the cover 1 has been pulled into position the hook 14 on the strap 7 is engaged with the automobile 2, then the zippers 3 may be closed over the headlights and the automobile 2 is securely covered.

Where the cover 1 is not custom-fitted to the model of the automobile 2, or for some reason is not the right size, the straps 7, 8 may have adjustment means (not shown) to get the hooks 14 to properly engage. Usually, there is enough resilience in the straps 7, 8 to provide a tight hold and hooking action.

Removal of the cover 1 is a reversed procedure wherein the hook 14 on the strap 7 is removed from the front of the automobile 2 and then the hook on the other end of the strap 7 is removed and the cover 1 pulled off from the rear, riding on the track formed by the strap 8. When the body 10 of the cover 1 is drawn to the rear of the automobile 2 the hooks 14 on strap 8 are removed and the automobile cover 1 is ready for storage.

The terms and expressions which are employed are used as terms of description; it is recognized, though that various modifications are possible within the scope of the invention claimed.

Having thus described certain forms of the invention in some detail, what is claimed is:

1. An automobile cover comprising a body, a first longitudinal strap attached at one end of said body, a second longitudinal strap attached at the other end of said body, guide means, each said strap slideably engaged by said guide means, said guide means adapted to guide such said strap along the length of said body, and hooks adapted to engage an automobile one hook at each end of said first and second straps.

2. An automobile cover comprising a body, a first longitudinal strap attached at one end of said body, a second longitudinal strap attached at the other end of said body, guide means, each said strap slideably engaged by said guide means, said guide means adapted to guide each said strap along the length of said body in parallel relationship, and hooks adapted to engage an automobile one hook at each end of said first and second straps.

3. An automobile cover comprising a body, a first longitudinal strap attached at one end of said body, a second longitudinal strap attached at the other end of said body, a plurality of channels adapted to guide said first strap, a plurality of channels adapted to guide said second strap, each said first and second guide channels adapted to guide each said strap along the length of said body, and hooks adapted to engage an automobile one hook at each end of said first and second straps.

4. An automobile cover comprising a body, an antenna opening in said body, a first longitudinal strap attached at one end of said body, a second longitudinal strap attached at the other end of said body, guide means, each said strap slideably engaged by said guide means, said guide means adapted to guide each said strap along the length of said body, and hooks adapted to engage an automobile one hook at each end of said first and second straps.

5. An automobile cover comprising a body, zipper portion adapted to juxtapose the headlight portions of said automobile, a first longitudinal strap attached at one end of said body, a second longitudinal strap attached at the other end of said body, guide means, each said strap slideably engaged by said guide means, said guide means adapted to guide each said strap along the length of said body, and hooks adapted to engage an automobile one hook at each end of said first and second straps.

6. An automobile cover comprising a body, a first longitudinal strap attached at one end of said body, a second longitudinal strap attached at the other end of said body, guide means, each said strap slideably engaged by said guide means, said guide means adapted to guide each said strap along the length of said body, and hooks adapted to engage an automobile one hook at each end of said first and second straps and said strap lengths being adjustable.

7. An automobile cover comprising a body, a first resilient longitudinal strap attached at one end of said body, a second resilient longitudinal strap attached at the other end of said body, guide means, each said strap slideably engaged by said guide means, said guide means adapted to guide each said strap along the length of said body, and hooks adapted to engage an automobile one hook at each end of said first and second straps.

References Cited by the Examiner
UNITED STATES PATENTS

| | | | |
|---|---|---|---|
| 2,716,433 | 8/1955 | Rawlings | 150—52 |
| 2,807,499 | 9/1957 | Duddleston | 150—52 |
| 2,874,709 | 2/1959 | Cohen et al. | 296—136 X |
| 2,994,356 | 8/1961 | Fleming | 296—136 X |

MILTON BUCHLER, *Primary Examiner.*

C. C. PARSONS, *Assistant Examiner.*